US009457761B2

(12) United States Patent
Villarreal et al.

(10) Patent No.: US 9,457,761 B2
(45) Date of Patent: Oct. 4, 2016

(54) ELECTRICALLY CONTROLLED VARIABLE FORCE DEPLOYMENT AIRBAG AND INFLATION

(71) Applicant: Raytheon Company, Waltham, MA (US)

(72) Inventors: James K. Villarreal, Denver, CO (US); Thomas M. Deppert, Gilbert, AZ (US); Mark T. Langhenry, Tucson, AZ (US); Matt H. Summers, Marana, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/289,513

(22) Filed: May 28, 2014

(65) Prior Publication Data

US 2015/0343988 A1   Dec. 3, 2015

(51) Int. Cl.
| B60R 21/264 | (2006.01) |
| B60R 21/00 | (2006.01) |
| F42B 3/14 | (2006.01) |
| F42B 3/04 | (2006.01) |
| F42B 3/12 | (2006.01) |
| F42C 19/08 | (2006.01) |
| F42C 19/12 | (2006.01) |

(52) U.S. Cl.
CPC .......... *B60R 21/2644* (2013.01); *B60R 21/00* (2013.01); *F42B 3/04* (2013.01); *F42B 3/128* (2013.01); *F42B 3/14* (2013.01); *F42C 19/0823* (2013.01); *F42C 19/12* (2013.01)

(58) Field of Classification Search
CPC .......................... B60R 21/264; B60R 21/2644
See application file for complete search history.

(56) References Cited

U.S. PATENT DOCUMENTS

| 3,910,805 | A | * | 10/1975 | Catanzarite | ............. | C06B 29/08 149/75 |
| 3,964,255 | A | * | 6/1976 | Catanzarite | ............. | C06B 29/08 149/109.2 |
| 4,023,995 | A | * | 5/1977 | Reed, Jr. | .................. | C06B 45/10 149/108.8 |
| 4,658,578 | A | * | 4/1987 | Shaw | ...................... | C06B 45/10 149/19.4 |
| 5,334,270 | A | * | 8/1994 | Taylor, Jr. | ............. | C06B 23/007 149/19.4 |
| 5,431,103 | A | | 7/1995 | Hock et al. | | |
| 5,449,423 | A | * | 9/1995 | Cioffe | ................. | C06B 21/0041 149/19.1 |
| 5,467,715 | A | | 11/1995 | Taylor et al. | | |
| 5,503,079 | A | * | 4/1996 | Kishi | ..................... | B01D 39/10 102/289 |

(Continued)

FOREIGN PATENT DOCUMENTS

FR    2560983 A1    9/1985

*Primary Examiner* — Barry Gooden, Jr.
(74) *Attorney, Agent, or Firm* — Eric A. Gifford

(57) ABSTRACT

The rate of combustion of an electrically operated propellant having self-sustaining threshold of at least 1,000 psi is controlled to produce chamber pressures that are sufficient to produce a desired pressure profile in the airbag to accommodate a range of human factors and crash conditions yet never exceeding the self-sustaining threshold. The combustion of the propellant is extinguished to control the total pressure impulse delivered to the airbag. Propellants formed with an ionic perchlorate-based oxidizer have demonstrated thresholds in excess of 1,500 psi and higher.

27 Claims, 7 Drawing Sheets

(56) References Cited

U.S. PATENT DOCUMENTS

| | | | |
|---|---|---|---|
| 5,518,054 A | 5/1996 | Mitson et al. | |
| 5,529,647 A | 6/1996 | Taylor et al. | |
| 5,544,687 A | 8/1996 | Barnes et al. | |
| 5,567,905 A | 10/1996 | Barnes et al. | |
| 5,771,679 A * | 6/1998 | Taylor, Jr. | C06B 23/007 149/19.1 |
| 5,845,578 A * | 12/1998 | Fogle, Jr. | F42B 3/11 102/202.5 |
| 5,847,315 A | 12/1998 | Katzakian, Jr. et al. | |
| 6,098,548 A | 8/2000 | Rink et al. | |
| 6,142,518 A * | 11/2000 | Butt | B60R 21/26 280/736 |
| 6,199,906 B1 | 3/2001 | Trevillyan et al. | |
| 6,210,505 B1 * | 4/2001 | Khandhadia | C06D 5/06 149/109.2 |
| 6,589,375 B2 | 7/2003 | Knowlton et al. | |
| 6,889,613 B2 | 5/2005 | Parizat et al. | |
| 7,788,900 B2 * | 9/2010 | Dulligan | F02K 9/26 60/234 |
| 7,958,823 B2 * | 6/2011 | Sawka | C06B 45/00 102/202 |
| 8,317,952 B2 | 11/2012 | Katzakian et al. | |
| 8,336,287 B1 * | 12/2012 | Petersen | F02K 9/92 149/2 |
| 8,464,640 B2 | 6/2013 | Sawka | |
| 8,857,338 B2 * | 10/2014 | Sawka | F02K 9/95 102/202 |
| 8,950,329 B2 * | 2/2015 | Villarreal | F02K 9/94 102/202 |
| 8,967,284 B2 * | 3/2015 | Sampson | A62C 5/006 169/12 |
| 9,073,512 B1 * | 7/2015 | Mayville | C06D 5/06 |
| 2004/0016480 A1 * | 1/2004 | Williams | C06D 5/06 149/46 |
| 2004/0216819 A1 * | 11/2004 | Serizawa | C06B 31/30 149/46 |
| 2006/0011276 A1 * | 1/2006 | Grix | C06B 45/10 149/1 |
| 2007/0227635 A1 * | 10/2007 | Marlin | C06C 9/00 149/87 |
| 2007/0272107 A1 * | 11/2007 | Twarog | C06C 5/04 102/275.1 |
| 2009/0031700 A1 * | 2/2009 | Karabeyoglu | C06B 47/02 60/205 |
| 2010/0275808 A1 * | 11/2010 | Stevens | B60R 21/2644 102/530 |
| 2011/0030859 A1 * | 2/2011 | Sawka | C06B 21/0025 149/109.6 |
| 2011/0067789 A1 * | 3/2011 | Grix | C06B 23/001 149/19.1 |
| 2011/0259230 A1 * | 10/2011 | Sawka | F02K 9/95 102/374 |
| 2012/0227875 A1 * | 9/2012 | Kim | C06B 29/22 149/47 |
| 2014/0158630 A1 * | 6/2014 | Diallo | C08G 83/006 210/684 |
| 2014/0174313 A1 * | 6/2014 | Villarreal | F02K 9/94 102/530 |

* cited by examiner

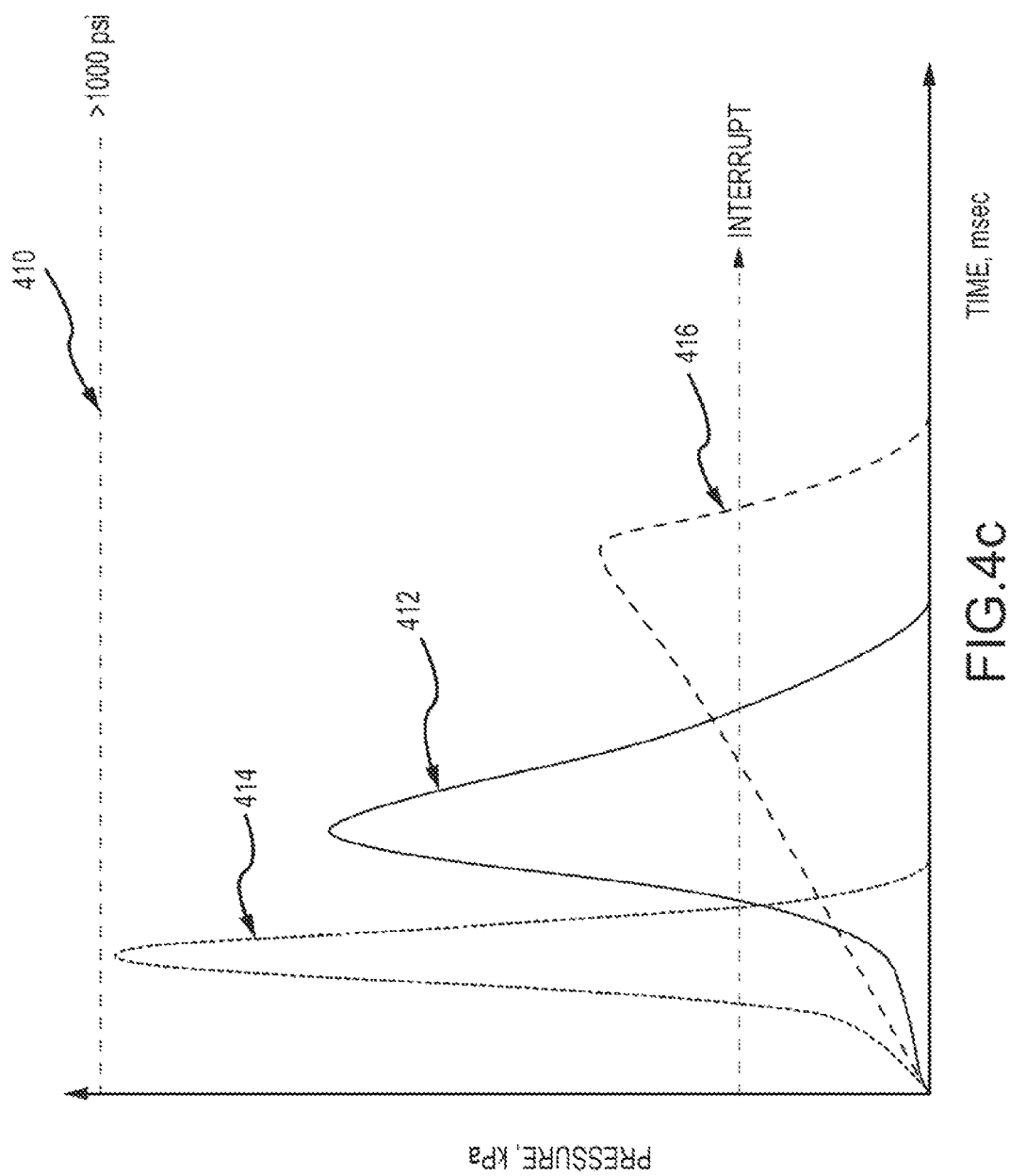

ELECTRICALLY CONTROLLED VARIABLE FORCE DEPLOYMENT AIRBAG AND INFLATION

RELATED APPLICATIONS

This application is related to U.S. Patent Application entitled "Electrically Operated Propellants", Ser. No. 13/726,462 filed on Dec. 24, 2012, the entire contents of which are incorporated by reference.

BACKGROUND OF THE INVENTION

1. Field of the Invention

This invention relates to airbag deployment and inflation technologies, and more particularly to controlling the combustion of an electrically operated propellant to control both the pressure profile and total pressure impulse to inflate the airbag.

2. Description of the Related Art

An airbag is an occupant restraint system consisting of a flexible fabric envelope or cushion designed to inflate rapidly during an automobile collision. Its purpose is to cushion occupants during a crash and provide protection to their bodies when they strike interior objects such as the steering wheel or a window. Modern vehicles may contain multiple airbag modules in various side and frontal locations of the passenger seating positions, and sensors may deploy one or more airbags in an impact zone at variable rates based on the type, angle and severity of impact; the front airbag is designed to only inflate in moderate to severe frontal crashes. Most designs are inflated through pyrotechnic means and can only be operated once.

A central airbag control unit (ACU) monitors a number of related sensors within the vehicle, including accelerometers, impact sensors, side (door) pressure sensors, wheel speed sensors, gyroscopes, brake pressure sensors, and seat occupancy sensors. The bag itself and its inflation mechanism is concealed within the steering wheel boss (for the driver), or the dashboard (for the front passenger), behind plastic flaps or doors which are designed to "tear open" under the force of the bag inflating. Once the requisite 'threshold' has been reached or exceeded, the airbag control unit will trigger the ignition of a gas generator propellant to rapidly inflate a fabric bag. As the vehicle occupant collides with and squeezes the bag, the gas escapes in a controlled manner through small vent holes. The airbag's volume and the size of the vents in the bag are tailored to each vehicle type, to spread out the deceleration of (and thus force experienced by) the occupant over time and over the occupant's body, compared to a seat belt alone.

The signals from the various sensors are fed into the ACU, which determines from them the angle of impact, the severity, or force of the crash, along with other variables. Depending on the result of these calculations, the ACU may also deploy various additional restraint devices, such as seat belt pre-tensioners, and/or airbags (including frontal bags for driver and front passenger, along with seat-mounted side bags, and "curtain" airbags which cover the side glass). Each restraint device is typically activated with one or more pyrotechnic devices, commonly called an initiator. The initiator is used to ignite solid propellant inside the airbag inflator. The burning propellant generates inert gas that fills a small chamber with high pressure, high temperature gas in milliseconds that expands (and cools) to inflate the airbag, which is unfolding and drastically increasing the volume at a much lower pressure in approximately 20 to 30 milliseconds. Chamber pressure is typically in the 100's of psi whereas the airbag pressure is in the 10's of psi. An airbag must inflate quickly in order to be fully inflated by the time the forward-traveling occupant reaches its outer surface. Typically, the decision to deploy an airbag in a frontal crash is made within 15 to 30 milliseconds after the onset of the crash, and both the driver and passenger airbags are fully inflated within approximately 60-80 milliseconds after the first moment of vehicle contact. If an airbag deploys too late or too slowly, the risk of occupant injury from contact with the inflating airbag may increase.

Airbag technologies are being developed to tailor airbag deployment to the severity of the crash, the size and posture of the vehicle occupant, belt usage, and how close that person is to the actual airbag. Many of these systems use multi-stage inflators (e.g. multiple 1-shot inflators) that deploy less forcefully in stages in moderate crashes than in very severe crashes. Occupant sensing devices let the airbag control unit know if someone is occupying a seat adjacent to an airbag, the mass/weight of the person, whether a seat belt or child restraint is being used, and whether the person is forward in the seat and close to the airbag. Based on this information and crash severity information, the airbag is deployed at either at a high force level, a less forceful level, or not at all.

Adaptive airbag systems may utilize multi-stage airbags to adjust the pressure within the airbag. The greater the pressure within the airbag, the more force the airbag will exert on the occupants as they come in contact with it. These adjustments allow the system to deploy the airbag with a moderate force for most collisions; reserving the maximum force airbag only for the severest of collisions. Additional sensors to determine the location, weight or relative size of the occupants may also be used. Information regarding the occupants and the severity of the crash are used by the airbag control unit, to determine whether airbags should be suppressed or deployed, and if so, at various output levels. See Wikipedia "airbag" May 8, 2014.

U.S. Pat. No. 8,317,952 entitled "High Performance Electrically Controlled Solution Solid Propellant" disclosed an electrically controlled propellant comprising a binder, a hydroxylamine nitrate (HAN) based oxidizer and a cross-linking agent. The use of the HAN-based oxidizer overcame the problems with melting of earlier propellant formulations. In one example, this propellant has exhibited the ability to extinguish at ≈350 psi and could be ignited at low voltages. However, subsequent tests indicated that 150 psi was an upper pressure limit for extinguishment. (Col 19, lines 21-24). We are currently applying our controllable solid propellant technology to developing motor and low cost controller technology to a dual-stage tactical rocket motors, in smart automotive airbags, and as an emergency ballast blow/purge system for submarines, replacing the typical all or nothing emergency gas generation ballasts with one that is more controllable. (Col. 20, lines 7-13).

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides for the controlled deployment and inflation of an airbag to deliver both a desired pressure profile and total impulse pressure for the safety of vehicle passengers in a crash.

This is accomplished with an electrically operated propellant having a self-sustaining threshold of at least 1,000 psi. Propellants formed with an ionic perchlorate-based oxidizer have demonstrated thresholds in excess of 1,500 psi. An electrical input is controlled to vary the rate of combustion to produce chamber pressures that are sufficient to produce a desired pressure profile in the airbag to accommodate a range of human factors and crash conditions yet never exceeding the self-sustaining threshold. As such, the combustion of the propellant may be extinguished to control the total pressure impulse delivered to the airbag.

In an embodiment, an amount of electrically operated propellant is placed in a combustion chamber that is coupled to an airbag. The propellant comprises an ionic perchlorate-based oxidizer, a binder and a fuel such that the propellant has a self-sustaining threshold pressure of at least 1,000 psi at which the ignited propellant cannot be extinguished. An electrical input ignites the propellant, generating pressurized gas within the chamber at pressures reaching more than 500 psi but never exceeding the self-sustaining threshold. The pressurize gas is exhausted from the chamber to inflate the airbag. The electrical input is varied to control the rate of combustion, hence the pressure in the chambers at levels less than the self-sustaining threshold yet sufficient to produce a desired pressure profile in the airbag. Combustion of the propellant is extinguished by interrupting the electrical input so as to burn less than all of the propellant and to deliver a desired total pressure impulse to the airbag.

In an embodiment, the ionic perchlorate-based oxidizer comprises a liquid perchlorate-based oxidizer of approximately 50 to 90 percent of the mass of the electrically operated propellant, the binder is approximately 10 to 30 percent of the mass of the electrically operated propellant, and the fuel comprises a metal-based fuel of approximately 5 to 30 percent of the mass of the electrically operated propellant. In an embodiment, the metal-based fuel in cooperation with the liquid perchlorate-based oxidizer provides the electrically operated propellant with a specific energy of around 600 to 1100 joules per gram at ambient pressure. In an embodiment, the electrically operated propellant has an initial total pressure impulse value at an initial time, and a mature pressure impulse value at a second time after storage for at least 30 days at a temperature of around 140 degrees Fahrenheit, and the mature total pressure impulse value is substantially the same as the initial total pressure impulse value.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 4a through 4c are plots of gas pressure versus time illustrating throttling, phase-shifting and extinguishing of a baseline profile, respectively.

DETAILED DESCRIPTION OF THE INVENTION

Figure 1:
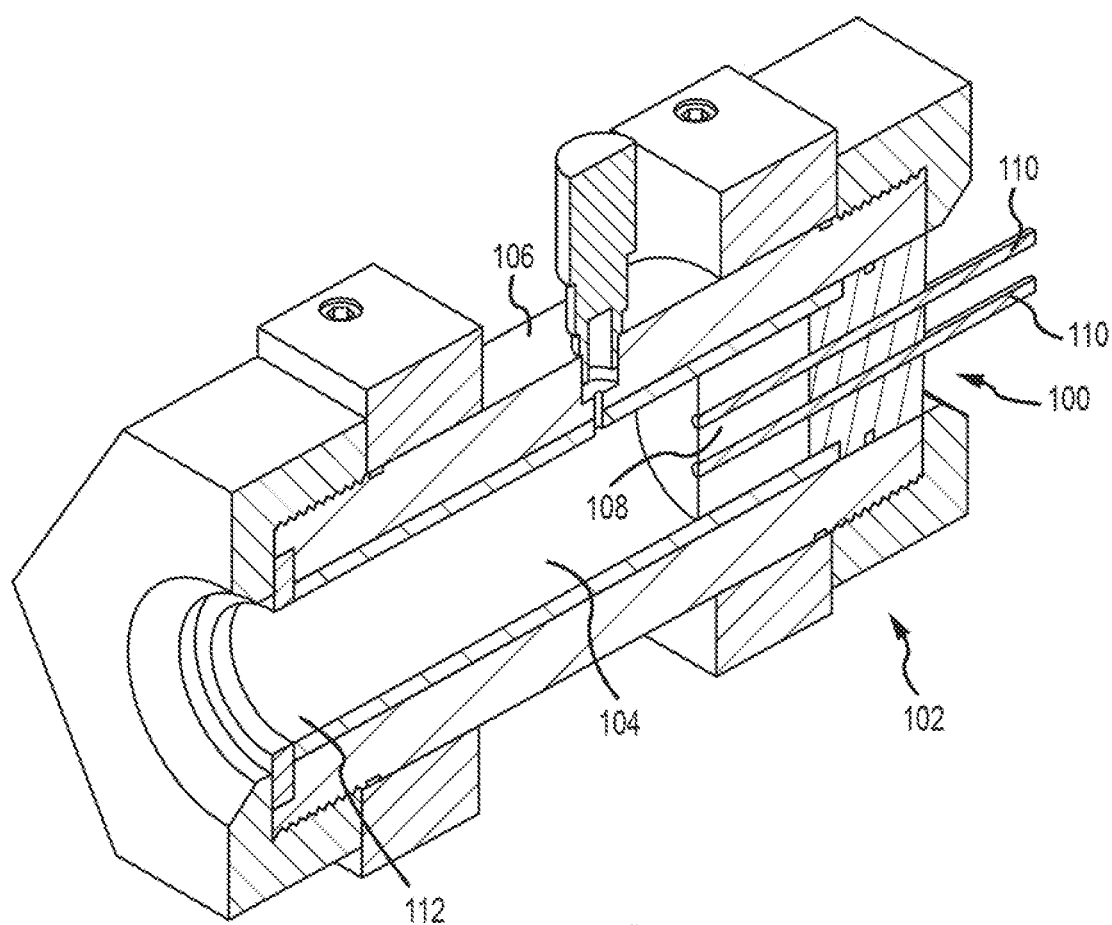
FIG. 1 is a sectional view of one embodiment of a gas generation assembly including an electrically operated propellant for inflating an airbag.

Ideally an adaptive airbag system would be responsive to the various sensed conditions of human factors e.g. occupant height, weight etc. and crash conditions e.g. speed, angle of impact etc. to inflate the airbag with a desired pressure profile with a specified total pressure impulse to best protect the occupant. Furthermore, the system would have the capability to optimize the pressure profile and total pressure impulse over a wide range of human factors and crash conditions. In theory, multi-stage inflators could be configured with a large number of 1-shot inflators that are ignited to produce the desired pressure profile and total pressure impulse. However, in practice, multi-stage inflators are limited to deploy the airbag at either at a high force level, a less forceful level, or not at all. The complexity, volume and cost of multi-stage inflators to provide this type of inflation capability are prohibitive.

Electrically operated propellants are attractive in that the combustion rate, hence airbag inflation pressure can be controlled via an electrical input. To fully control the pressure profile and to provide a specified total pressure impulse one must be able to extinguish the combustion of the electrically operated propellant. The mass of the propellant dictates the maximum total pressure impulse that could be delivered to the airbag if the entirety of the propellant is consumed. This mass would suitably be designed to be some margin above the total pressure impulse required for worst case conditions. The electrical input would be controlled to burn less than all of the propellant to deliver a desired pressure profile having a total pressure impulse based on actual human factors and crash conditions.

Electrically operated propellants have a self-sustaining threshold pressure that once-crossed eliminates the ability to extinguish combustion. Interruption of the electrical input will not extinguish combustion past this self-sustaining threshold value. The propellant will burn until all of the propellant is gone. In the case of airbag inflation this means that if the self-sustaining threshold pressure is exceeded the propellant will burn until it is gone delivering the maximum total pressure impulse to the airbag. The relevant pressure is the propellant operating pressure in the combustion chamber that affects the combustion burn rate, not the much lower pressure in the volume of the airbag.

As disclosed in U.S. Pat. No. 8,317,952 electrically operated propellants having a HAN-based oxidizer, exhibited in one example, the ability to extinguish at psi. However, subsequent tests indicated that 150 psi was an upper pressure limit for extinguishment. (Col 19, lines 21-24).

The issue is that in modern airbag systems the pressures in the combustion chambers reach levels greater than 350 psi to produce the requisite airbag inflation pressures in the 30 to 40 psi. Consequently, the chamber pressure would rapidly exceed the self-sustaining threshold of a HAN-based propellant and would continue to burn until the propellant was consumed delivering the maximum total pressure impulse to the airbag. The ACU would not be able to adapt the pressure profile and total pressure impulse to the sensed human factors and crash conditions to provide optimum airbag deployment and inflation.

The present invention provides for the controlled deployment and inflation of an airbag to deliver both a desired pressure profile and total pressure impulse for the safety of vehicle passengers in a crash. This is accomplished with an electrically operated propellant having a self-sustaining threshold of at least 1,000 psi. Propellants formed with an ionic perchlorate-based oxidizer have demonstrated thresholds in excess of 1,500 psi and higher. An electrical input is controlled to vary the rate of combustion to produce chamber pressures that are sufficient to produce a desired pressure profile in the airbag to accommodate a range of human factors and crash conditions yet never exceeding the self-sustaining threshold. As such, the combustion of the propellant may be extinguished to control the total pressure impulse delivered to the airbag.

FIG. 1 shows an example of a gas generation system 100 that uses an electrically operated propellant as part of an overall airbag assembly 102. The gas generation system includes an electrically operated propellant 108, configured to exhaust high-pressure gas through an opening 112 to inflate an airbag. Opening 112 may be or may not be formed as a nozzle.

The gas generation system 100 includes a combustion chamber of 104 having an electrically operated propellant 108 positioned therein. An electrode structure suitably comprising two or more electrodes 110 extend into the electrically operated propellant 108 within the combustion chamber 104. The electrically operated propellant 108 fills a portion of combustion chamber 104 and has a predetermined grain shape. In another example, the electrically operated propellant 108 fills substantially the entirety of the combustion chamber 104. That is to say, the electrically operated propellant 108 extends from the position shown in FIG. 1 toward a position in close proximity to the opening 112. Accordingly, the two or more electrodes 110 similarly extend through the electrically operated propellant 108 toward the opening 112.

As will be described herein the electrically operated propellant 108 includes a formulation that allows for the ignition and extinguishing of the propellant in a variety of conditions according to the application (and interruption of the application) of electricity through the electrodes 110. For instance, the electrically operated propellant 108 is configured to ignite with the application of voltage across the electrodes 110. Conversely, the electrically operated propellant 108 is extinguished with the interruption of the voltage at a range of pressures (e.g., from 0 psi to 2000 psi or higher). For instance, where the airbag assembly is in the process of inflating the airbag the pressure within the combustion chamber 104 is greater than 500 psi, for instance from 500 to 2,000 psi. In this condition, it may be desirable to interrupt the burn of the electrically operated propellant 108 to control the inflation pressure and total pressure impulse. In such a circumstance the voltage applied across the electrodes 110 is interrupted. Despite the pressurized environment of the combustion chamber 104 subjecting the electrically operated propellant 108 to a pressure greater than 500 psi, for instance pressures approaching 2,000 psi, the interruption of voltage to the electrodes 110 allows the electrically operated propellant 108 to extinguish. With the electrically operated propellant 108 extinguished the inflation of the airbag is halted. That is to say, with the electrically operated propellant 108 described in further detail herein the gas generation systems 100 are configured for ignition and extinguishing during operation. Importantly, even with ambient or high pressures within the combustion chamber 104, such as atmospheric pressure, pressures greater than 500 psi, 1000 psi, 1500 psi and up to 2000 psi the electrically operated propellant 108 is extinguished with the interruption of electricity (e.g., voltage or current) applied across the electrodes 110.

In one example, the electrically operated propellant 108 is constructed with, but not limited to, three or more components including a liquid perchlorate-based oxidizer, a binder, and a fuel that form a solid propellant as described herein. As will be further described herein, the combination of these three components in various proportions of the overall mass of the electrically operated propellant 108 tunes the operation of the electrically operated propellant 108 and ensures that the electrically operated propellant is configured for ignition and extinguishing at a variety of conditions. For instance, the electrically operated propellant 108 described herein including a liquid perchlorate-based oxidizer, a binder and a fuel, such as a metal-based fuel, is configured to ignite (in an ignition condition) with the application of voltage across the electrodes 110 and at the same time is configured to extinguish (in an extinguishing condition) over a broad range of pressures within the combustion chamber 104 (pressures up to and possibly exceeding 2000 psi). That is to say, the formulation of the liquid perchlorate-based oxidizer, a binder and the fuel are configured to facilitate the ignition of the electrically operated propellant 108 with the application of electricity and correspondingly extinguish the propellant 108 with the cessation of electricity even where the electrically operated propellant 108 is subjected to pressures greater than 500 psi. Stated another way, the electrically operated propellant 108 is not self-sustaining even at high pressures, such as pressures of 500 psi or more and less than 2000 psi. Accordingly, the electrically operated propellant 108 is configured for "on" and "off" operation under a variety of conditions, and is able to automatically shut off with the interruption of electricity.

Figure 2:
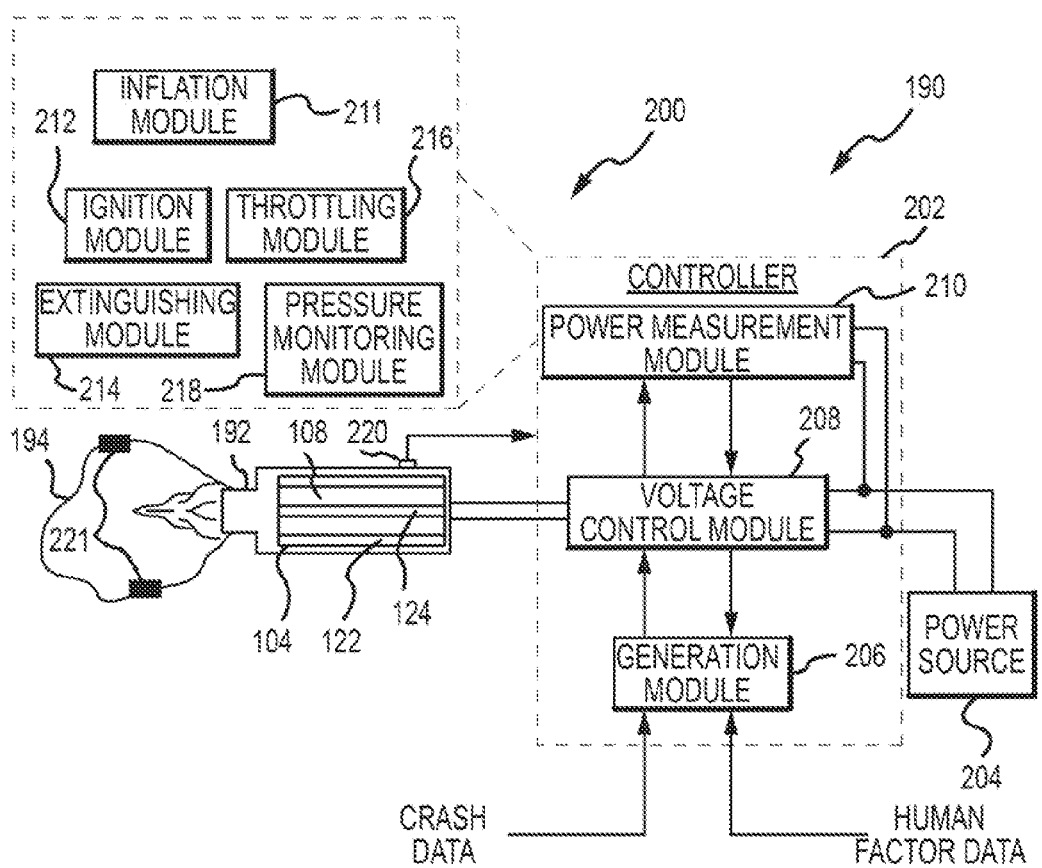
FIG. 2 is a block diagram of an embodiment of an airbag assembly.

FIG. 2 shows one example of an airbag assembly 190 including a gas generation system 192, an airbag 194 coupled thereto and an airbag control unit (ACU) 200. The ACU 200 includes a controller 202 coupled with a power source 204. In one example, the power source includes, but is not limited to, an electrical power source such as a battery, generator or the like. As further shown in FIG. 2, the controller 202 is coupled with the gas generation system 192 including the electrically operated propellant 108.

The controller 202 is shown as including in one example a generation module 206 that is coupled with a voltage control module 208 and a power measurement module 210. Generation module 206 is coupled to receive both human factor inputs such as height, weight, proximity to airbag etc. and crash data such as vehicle speed, impact angle etc. from various sensors placed about the vehicle. The generation module 206 is configured to control the amount of high-pressure gas provided by the gas generation system 192 to inflate airbag 194. For instance, as ignition, throttling and extinguishing of high pressure gas output from the gas generation system 192 is desired to inflate the airbag according to a desired pressure profile having a total pressure impulse according to the sensed human factor inputs and crash data, the generation computer 206 is configured to provide this control by way of management of the electrical output to the gas generation system 192 through control of the voltage control module 208.

The voltage control module 208 is coupled along the electrical circuit between the power source 204 and the gas generation system 192. The voltage control module 208 is in one example coupled with the power measurement module 210. The power measurement module 210 is configured to measure the output of the power source 204 and thereby facilitate control and administration of the appropriate amount of electricity such as voltage, current or the like to the gas generation system 120 through the voltage control module 208. For instance, in one example the generation module 206 determines that one or more of extinguishing, ignition or throttling of gas generation from the gas generation system 192 is desired. The voltage control module 208 is controlled by the generation module 206 to accordingly adjust the application of electrical energy such as voltage to the electrodes 122, 124. The power measurement module 210 measures the output of the power source 204 and accordingly cooperates with the voltage control module 208, for instance by way of feedback control using the output of the power source 204, to measure and adjust the amount of electricity provided to the gas generation system 192.

As previously described herein in one example the controller 202 includes a series of modules configured to calculate a desired airbag pressure profile and total pressure impulse and to control and operate the gas generation system 192. In one example, the controller 202 includes a generation module 206 configured to operate the gas generation system 192 for instance through control of the voltage control module 208. In one example, the generation module 206 includes a plurality of modules each configured to control one or more functions of the gas generation system 120. For instance, referring again to FIG. 2 the generation module 206 includes one or more of an inflation module 211, an ignition module 212, an extinguishing module 214 and a throttling module 216. Each of these modules controls various corresponding functions of the gas generation system 192.

In one example, the inflation module 211 is configured to receive the human factor inputs and crash data from the various sensors and to calculate a desired airbag pressure profile (e.g. rise time, breakout pressure, shape of profile and duration) having a total pressure impulse (e.g. the integral of the pressure profile) less than the maximum total pressure impulse of the propellant. The inflation module 211 is configured to calculate the propellant burn rate required to match or closely approximate the pressure profile and to calculate the electrical input and propellant operating pressure to provide the required burn rate. The propellant operating pressure is not allowed to exceed the propellant's self-sustaining threshold pressure and would be bounded away from the threshold by a defined margin.

In one example, the ignition module 212 is configured to control the application of electrical energy to the gas generation system 192 in an ignition configuration, for instance where ignition of the electrically operated propellant 108 shown in FIG. 1 is desired. In another example, the extinguishing module 214 is conversely configured to interrupt the application of electricity to the propellant 108 and thereby extinguish the electrically operated propellant when such interruption of gas generation is desired. In one example, the extinguishing module 214 cooperates with the voltage control module 208 to provide a shut-off function to the electrically operated propellant 108 when extinguishing of the electrically operated propellant (even at high pressures greater than 500 psi) is desired. Because the electrically operated propellant is not self-sustaining, even at pressures approaching 2000 psi, the extinguishing module is configured to shut the propellant down in high-pressure environments.

The ACU 200 further includes a throttling module 216 configured to graduate the application of electrical energy to the electrically operated propellant 108. In one example, the electrically operated propellant 108 is able to throttle its burn (increase or decrease the burn rate) according to the application of electrical energy to the propellant 108 (an initial voltage compared to an increased voltage and decreased voltage for corresponding changes to the burn rate). For instance, the throttling module 216 controls the voltage control module 208 to apply additional electrical energy to the gas generation system 120 when increased gas generation (higher airbag inflation pressure) is desired. Conversely, the throttling module 216 is also configured to decrease the application of electrical energy to the electrically operated propellant 108 through the voltage control module 208 when a decrease of gas generation is desired, for instance to reduce the airbag pressure.

In another example, the ACU 200 includes a pressure monitoring module 218 in communication with a pressure sensor 220 as shown in FIG. 2. The pressure sensor 220 is in one example coupled with the combustion chamber 104 and is able to measure the pressure within the combustion chamber 104 and thereby accordingly measure the pressure incident on the electrically operated propellant 108. In one example, the electrically operated propellant 108 requires differing power outputs for ignition as well as sustaining of burning of the propellant after ignition. For instance, at ignition the electrically operated propellant 108 requires in one example around 800 joules per gram of electricity for the electrically operated propellant to ignite. In another example, the electrically operated propellant requires significantly less electrical input to sustain burning of the propellant 108 (e.g., 150 to 250 joules per gram, an in another example 200 joules per gram or less). Accordingly, in one example, the pressure sensor 220 is configured to measure the pressure within the combustion chamber 104 to determine burn rate and thrust and accordingly assist in determining when ignition begins and ceases within the gas generation system 192. Upon determination of the ignition of the electrically operated propellant 108 the pressure monitoring module 218 cooperates with the voltage control module 208 to reduce the amount of electrical energy applied to the propellant 108 and thereby conserve energy of the power source 204.

In another example, pressure monitoring module 218 is in communication with a pressure sensor 221 as shown in FIG. 2. The pressure sensor 221 is in one example inside airbag 194 and is able to measure the pressure within the airbag 194 as it inflates. In one example, the pressure sensor 221 is used in conjunction with the pressure monitoring module 218, combustion chamber pressure sensor 220 and inflation module 211 to control the inflation rate and subsequent deflation rate of the airbag 194.

As previously described herein, the electrically operated propellants such as the propellant shown in FIG. 1 includes a plurality of components configured to facilitate the electrical operation of the propellant while at the same time enabling the extinguishing of the propellant at a range of pressures for instance pressures form ambient atmosphere, to greater than 500 psi, and less than or equal to 2000 psi. In one example, a combustion chamber such as the combustion chamber 104 shown in FIG. 1 reaches pressures between 500 and 2000 psi in order to exhaust high pressured gas to inflate the airbag to pressures between 30 and 40 psi.

The electrically operated propellant 108 configured as described herein is able to ignite and extinguish within the high-pressure environment of the combustion chamber 104. For instance, at pressures between at least ambient pressure and 2000 psi the electrically operated propellant 108 is able to extinguish with the interruption of electricity applied to the electrodes 110. Stated another way, the electrically operated propellant 108 is not self-sustaining at high pressures (e.g., does not continue to burn without electrical input) and is thereby operated according to the application of electrical energy from the electrodes 110 throughout the operation of the gas generation system 192.

As described herein, the electrically operated propellant in one example is a solid fuel having a plurality of components including, but not limited to, an oxidizer, a fuel, and a binder. In one example, the oxidizer is a liquid perchlorate-based oxidizer comprising approximately 50 to 90 percent of the total mass of the electrically operated propellant 108. A liquid perchlorate-based oxidizer includes but is not limited to perchlorate-based oxidizers such as aluminum perchlorate, barium perchlorate, calcium perchlorate, lithium perchlorate, magnesium perchlorate, perchlorate acid, strontium perchlorate, sodium perchlorate and the like as shown in the table below. The preceding list is not intended to be limiting but merely provides examples for use with the electrically operated propellant 108.

| Electrically Operated Propellant |
| --- |
| Oxidizer - Liquid Based Perchlorate Oxidizer (50 to 90 percent by mass) |
| aluminum perchlorate, barium perchlorate, calcium perchlorate, lithium perchlorate, magnesium perchlorate, perchlorate acid, strontium perchlorate, sodium perchlorate |
| Fuel - Metal Based Fuel (5 to 30 percent by mass) |
| tungsten, magnesium, copper oxide, copper, titanium, aluminum |
| Binder (remainder) |
| casein, methyl cellulose, polyethylene oxide, polyvinyl acetate, polyvinyl alcohol |

Additionally, the electrically operated propellant 108 in another example includes a fuel. The fuel comprises approximately 5 to 30 percent by mass of the electrically operated propellant 108. In one example, the fuel includes but is not limited to a metal-based fuel. As previously described herein, the metal-based fuel assists in the ignition and extinguishing of the electrically operated propellant 108. For instance, the provision of a metal-based fuel increases the conductance of the electrically operated propellant 108 and thereby facilitates the application of electricity to the propellant for ignition. Conversely, the metal-based fuel enables the ability to retard combustion of the propellant via the same increase in conductance, and a decrease in power input from the voltage control module 208. Accordingly, the metal-based fuel thereby retards combustion of the electrically operated propellant 108 and facilitates the extinguishing of the propellant upon interruption of electricity. As shown in the table provided above, the metal-based fuel includes, but is not limited to, tungsten, magnesium, copper oxide, copper, titanium and aluminum. The preceding list is not intended to be limiting but merely provides examples for use with the electrically operated propellant 108. Optionally, the electrically operated propellant 108 is formed without a fuel (e.g., having a fuel mass percentage of 0). A filter is typically positioned upstream of the airbag 194 to manage any fuel particulates and unwanted perchlorate combustion gas byproducts.

In another example, the electrically operated propellant 108 as described herein includes a third component including, but not limited to, a binder. The binder in one example comprises the remainder of the mass percentage of the electrically operated propellant 108. In one example, the binder includes but is not limited to casein, methyl cellulose, polyethylene oxide, polyvinyl acetate, polyvinyl alcohol or the like. The binder in one example cooperates with the oxidizer and the fuel to combine these components into a solid fuel propellant shapeable into any configuration such as the cylindrical configurations provided in FIG. 1. As described herein, the electrically operated propellant 108 has a storage modulus sufficiently high to allow for the maintenance of the shape the propellant is molded into at manufacture. For instance, the electrically operated propellant 108 has a storage modulus of 300 psi or greater at ambient temperature that accordingly allows the propellant 108 to maintain its shape through dynamic conditions. The propellant 108 with a consistent shape accordingly maintains a predictable performance profile as the shape and surface area of the propellant are relatively static during operation. The electrically operated propellant 108 is thereby formable (e.g., can be cast or molded) into any number of grain configurations and reliably perform with a desired performance profile even when subject to dynamic conditions.

The electrically operated propellant 108 with the components described above is able to ignite and extinguish with the respective application and interruption of application of electricity to the propellant over a range of pressures, from ambient pressure to high pressures of the type found in a combustion chamber for an airbag. The electrically operated propellant 108 is able to extinguish itself even while at high pressures. These pressures range from more than 400 psi to 2000 psi. With the interruption of electrical energy to the electrically operated propellant 108 the propellant ceases burning and extinguishes itself within the combustion chamber 104. In one example, the metal-based fuel and the liquid perchlorate-based oxidizer cooperate to facilitate the ignition and extinguishing of the electrically operated propellant 108 subject to these conditions. Additionally, the liquid perchlorate-based oxidizer cooperates with the metal-based fuel to ensure that the varied application of electrical energy to the electrically operated propellant 108 correspondingly throttles the gas output of the electrically operated propellant (e.g., with an adjustable burn rate based on the graduation of electrical potential or current applied to the propellant).

Additionally, the electrically operated propellant 108 is configured to minimize the power source 204 by requiring a smaller relative input compared to other electrically operated propellants to ignite and sustain burning of the propellant. For instance, the electrically operated propellant 108 has a relatively small specific energy of approximately 600 to 1100 joules per gram at ambient pressure (e.g., in one example 800 joules per gram) compared to other electrically operated propellants with significantly higher specific energies (e.g., specific energies of around 2400 joules per gram or greater). In one example, the metal-based fuel including for instance tungsten therein cooperates with the liquid perchlorate-based oxidizer to ensure that a relatively small application of electrical energy equivalent to 800 joules per gram is able to initiate ignition of the electrically operated propellant 108. Additionally, with the provision of a metal-based fuel the specific energy needed to sustain burning of the electrically operated propellant 108 is also minimized (for instance 200 joules per gram is sufficient to maintain combustion of the propellant 108). Because of the relatively low specific energy requirements of the electrically operated propellant 108 in these two or more configurations (ignition and sustained burning) ignition as well as throttling through the application of varied electrical input is attained with a relatively small power source. Accordingly, a system such as the gas generation system 100 including the airbag combustion assembly 102 only requires a small power source such as the power source 204 shown in FIG. 2 as opposed to larger battery power sources otherwise provided with other electrically operated propellants having higher specific energy requirements. For instance the power source is configured in one example to provide ignition power of 800 joules per gram and sustained power of 200 joules per gram with variation according to differing propellant formulation permutations as provided herein.

The electrically operated propellant 108 is also able to maintain its shape when exposed to dynamic kinematic conditions. In one example, the electrically operated propellant 108 has a storage modulus of 300 psi or greater at room temperature. With the incorporation of other binders the electrically operated propellant 108 may have a greater elastic modulus that thereby allows the maintenance of the shape of the electrically operated propellant 108 under even greater stresses. By providing the electrically operated propellant with a higher storage modulus relative to other electrically operated propellants (e.g., with elastic storage modulus of around 60 psi or less at room temperature) the propellant 108 is able to maintain a desired shape throughout operation of the gas generation system 192. Accordingly, the burn rate and other performance characteristics for the propellant 108 are predictably maintained throughout the operation of the gas generation system 192. That is to say, the propellant is not subject to significant cracking or deformation under dynamic conditions. Phenomena such as slumping, flattening or cracking of the electrically operated propellant 108 are thereby substantially avoided and correspondingly the electrically operated propellant has a predictable mechanical and performance profile.

Additionally, the combination of the liquid perchlorate-based oxidizer as well as the metal-based fuel in at least some examples provides an electrically operated propellant 108 that is configured for storage for significant periods of time while at the same time maintaining its performance characteristics. For instance, in one example, one or more of the gas generation system 192 are provided to an end user and often stored within enclosed spaces such as crates for extended periods of time such as months, years or the like. Often these systems 192 are stored in areas that are not well ventilated and are subject to heat from nearby components, exterior heating such as solar heating and the like. The electrically operated propellant 108 described herein is able to maintain its performance characteristics for instance its total pressure impulse value, ignition rise time, peak pressure, weight propellant density and the like throughout the storage period even while the electrically operated propellant 108 is exposed to temperatures approaching 140 degrees Fahrenheit.

For instance, in one example, the electrically operated propellant 108 has an initial total impulse value, defined here as the integral of thrust versus time, of 800 pound seconds at an initial rise time and has a mature impulse value, again, of approximately 800 pound seconds at a second time after storage of the gas generation systems 100, 120 for at least 30 days at a temperature of around 140 degrees Fahrenheit. As described herein the mature impulse value remains substantially the same compared to the initial impulse value (e.g., of 800 pound seconds in one example) even with storage under these conditions. In other examples, the electrically operated propellant 108 is stored under these conditions for much longer periods of time for instance a year, two years, five years, ten years or more while at the same time substantially maintaining the mechanical properties and total impulse value (and other performance characteristics) from the initial configuration to the mature configuration at these later times.

Figure 3:
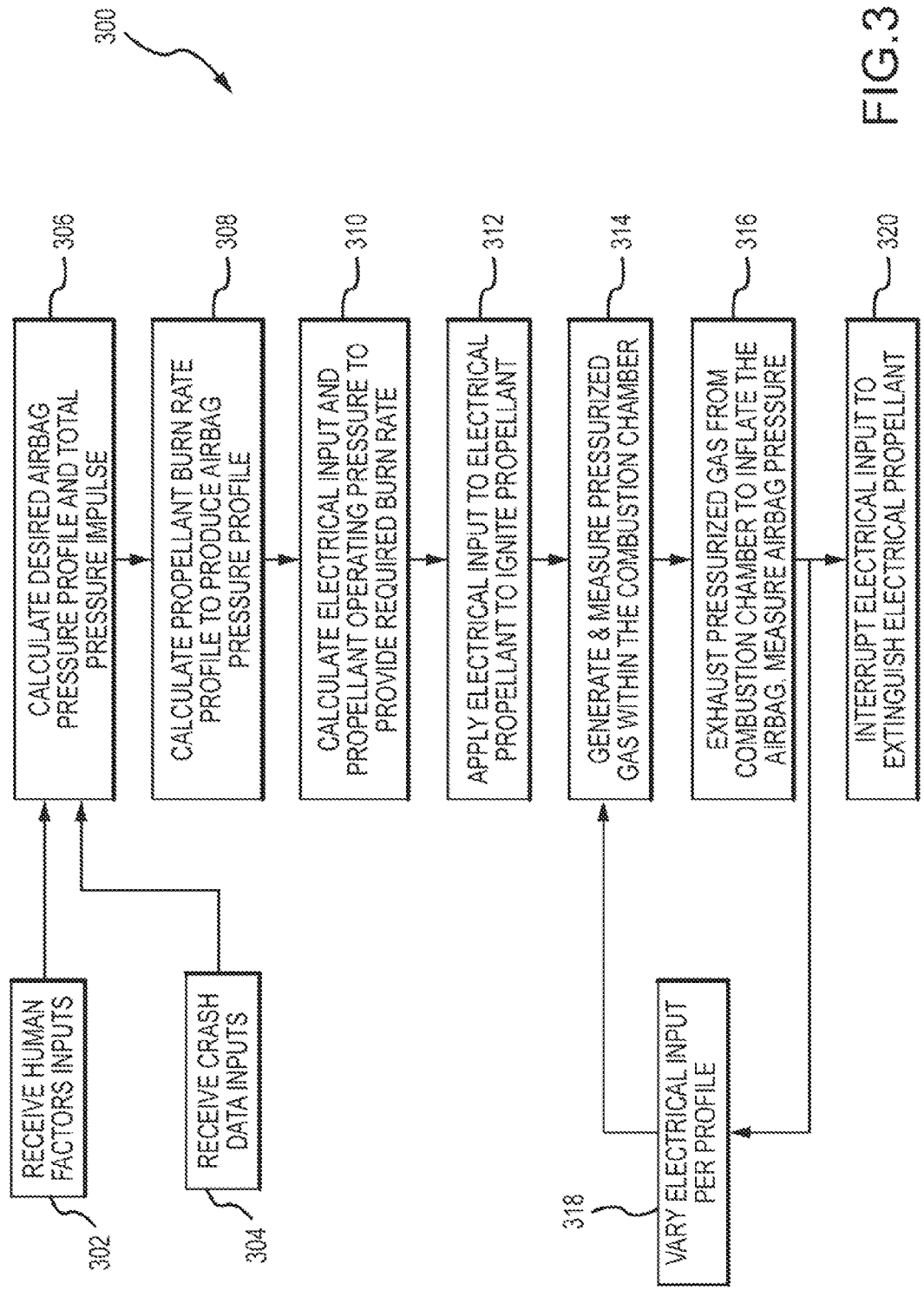
FIG. 3 is a flow diagram of an embodiment for controlling an electrically operated propellant to deploy and inflate an airbag.

FIG. 3 shows one example of a method 300 for using an electrically operated propellant, such as the propellant 108 previously described herein, to deploy and inflate an airbag 194. In describing the method 300 reference is made to one or more components, features, functions and the like described herein. Where convenient, reference is made to the components and features with reference numerals. Reference numerals provided are exemplary and are not exclusive. For instance, the features, components, functions and the like described in the method 300 include, but are not limited to, the corresponding numbered elements, other corresponding features described herein (both numbered and unnumbered) as well as their equivalents.

At 302, the method 300 includes receiving human factor inputs such as occupant height, weight and proximity to the airbag assembly for various sensors.

At 304, the method 300 includes receiving crash data inputs such as vehicle speed, accelerations, impact angle etc. for various sensors.

At 306, the method 300 includes calculating a desired airbag pressure profile having a specified total pressure impulse based on the human factor and crash data inputs and the maximum total pressure impulse available. The pressure profile may be characterized by rise and fall times, a breakout pressure (max inflated pressure), shape and duration. The shape and rise or fall times may be modulated before or after the breakout pressure.

At 308, the method 300 includes calculating the propellant burn rate required to produce the desired pressure profile and total pressure impulse for airbag inflation. The desired airbag pressure profile requires a known mass flow rate of gases to inflate the airbag. The equation for mass flow rate "m" of the combustion gases is m=ρrA, where "r" is the required burn rate, "A" is the burning surface area of the propellant 108 grain, and "ρ" is the propellant 108 density. Given a manufactured propellant 108 grain shape where the density and initial surface area are set, the regression rate of the propellant 108 is the only independent variable to provide the desired airbag pressure profile.

In the method 300, steps 306 and 308 could be performed via a look up table having a library of pre-calculated burn rate profiles. In other words, the set of analytical equations governing the airbag combustion process do not need to be solved, iteratively or otherwise, for each crash event. Rather, a look up table with prescribed values, solved beforehand analytically or empirically, can instead be used to minimize the time between the crash event and the airbag deployment phases.

At 310, the method 300 includes calculating the electrical input (e.g. voltage "v") and the propellant operating pressure "p" to provide the required burn rate "r", in one form where r=ap$^n$v$^l$ where "a", "n" and "l" are empirical constants. In this equation both voltage and operating pressure control the burn rate, and thus mass flow rate, of the airbag propellant 108. As an example of operation, if two identical propellant samples are ignited and sustained by the same power value, the propellant will have a higher burn rate if one sample is in a higher pressure environment. These two variables are intrinsically related and in practice one variable is typically set at a constant while the other is varied to provide a variable response.

At 312, the method 300 includes igniting an electrically operated propellant 108 by applying an electrical input to the electrically operated propellant. The electrically operated propellant 108 in one example is within a combustion chamber 104 previously shown in FIG. 1. Optionally, a plurality of electrodes 110 extend through at least a portion of the electrically operated propellant 108 to provide the electrical input to the propellant.

At 314, the method 300 includes generating pressurized gas within the combustion chamber 104 from the ignited electrically operated propellant 108. In one example, a pressure in the combustion chamber is greater than ambient pressure. For instance, the pressure in the combustion chamber reaches more than 500 psi therein. The chamber pressure may be measured.

At 316, the method 300 includes exhausting the pressurized gas from combustion chamber 104 through the opening 112 to inflate airbag 194. The airbag pressure may be measured.

At 318, the method 300 includes varying the electrical input per the profile calculated to provide the required burn rate to produce the airbag pressure profile. The electrical input may be varied open-loop based only on the calculated profile or may be varied closed-looped based on the calculated profile and measured pressures in one or both of the combustion chamber and the airbag.

At 320, the method 300 includes interrupting the electrical input to extinguish the electrically operated propellant 108. In one example, extinguishing of the electrically operated propellant 108 is accomplished at a variety of pressures including pressures across a range from ambient pressure to around 2000 psi. In another example, extinguishing the electrically operated propellant includes extinguishing the propellant 108 at pressures greater than 500 psi. That is to say, the electrically operated propellant 108, even at high pressures such as pressures greater than 500 psi and less than or equal to 2000 psi, is not self-sustaining Stated another way, with the interruption of the application of electricity to the electrodes 110 the electrically operated propellant 108 is self-extinguishing and thereby ceases the generation of high pressure exhaust gases (shuts off). Accordingly, where a gas generation system 192 is incorporated into an environment wherein the pressure around the electrically operated propellant 108 will rise the electrically operated propellant maintains a self-extinguishing property throughout the range of pressures to thereby ensure that the electrically operated propellant 108 may be shut down throughout the operation of a gas generation system.

In another example, the method 300 further includes storing the electrically operated propellant 108 for at least 30 days at a temperature of around 140 degrees Fahrenheit. The electrically operated propellant 108 has an initial total impulse value at an initial time, for instance at the beginning of the 30 day span, and it has a mature total impulse value after the 30 day span of storage at high storage temperature conditions (or corresponding initial and mature values of one or more performance characteristics). The initial and mature total impulse values of the electrically operated propellant 108 are substantially the same at both the beginning and the end of the 30 day span. That is to say the performance characteristics of the electrically operated propellant are maintained even after the propellant 108 is stored for instance for 30 days or more at temperatures of 140 degrees Fahrenheit. In one example, the impulse value of the propellant is approximately 800 pound seconds both as the initial impulse value and as the mature impulse value.

Figure 4A:
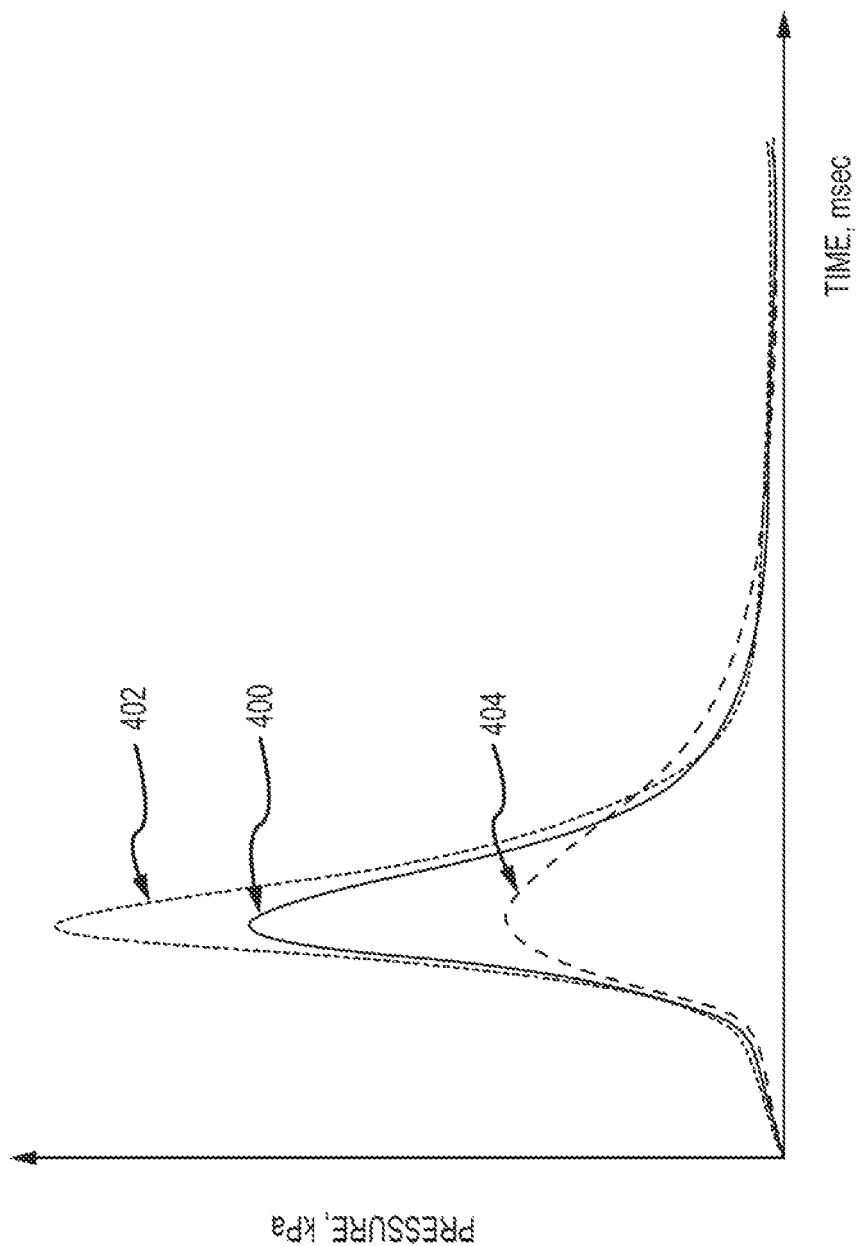
Figure 4B:
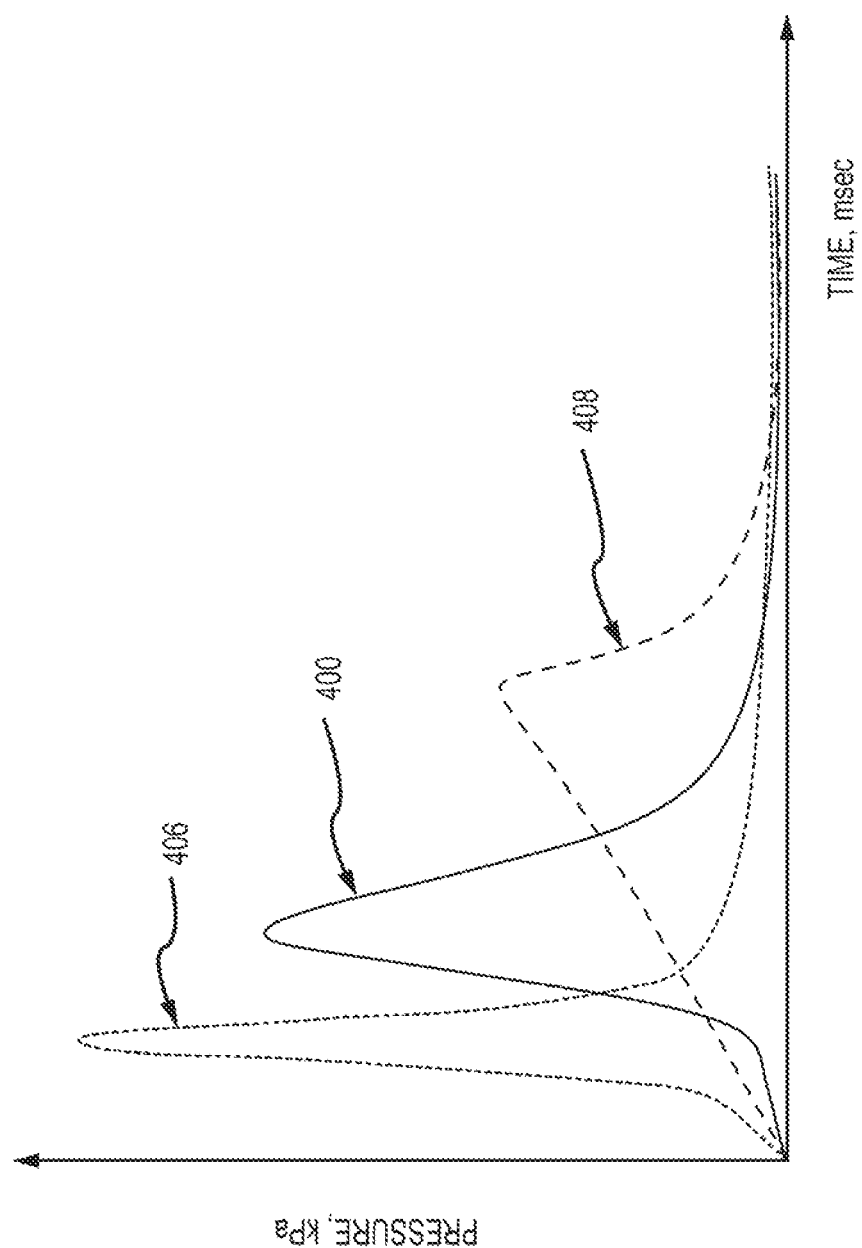

FIGS. 4a through 4c show plots of gas pressure in the combustion chamber versus time illustrating throttling, phase-shifting and extinguishing of a baseline profile 400, respectively. The baseline profile 400 is produced by a baseline electrical input having a nominal amplitude and duration with certain rise and fall times. As shown in FIG. 4a, the amplitude of the electrical input can be varied to "throttle" the combustion of the propellant. Increasing the amplitude of the electrical input increases the peak pressure of profile 402 and decreasing the amplitude of the electrical input decreases the peak pressure of profile 404. The duration of the electrical input may be decreased and increased opposite of the amplitude to preserve the total pressure impulse. Alternately, the duration may be decoupled from the amplitude to vary the total pressure impulse as long as it is less than the max total pressure impulse of the mass of propellant. As shown in FIG. 4b, the electrical input can be varied to phase-shift baseline profile 400 to create profiles 406 or 408. As shown in FIG. 4c, as long as the pressure never exceeds the propellant's self-sustaining threshold 410 the electrical input can be interrupted to extinguish combustion of the propellant and produce a rapid reduction in airbag pressure as shown for a baseline profile 412 and phase-shifted and amplitude modulated profiles 414 and 416. In general, the electrical input may be controlled to implement different combinations of throttling, phase-shifting and extinguishing to produce a pressure profile in the chamber, one that never exceeds the self-sustaining threshold, to estimate a desired pressure profile and total pressure impulse delivered to the airbag.

Figure 5:
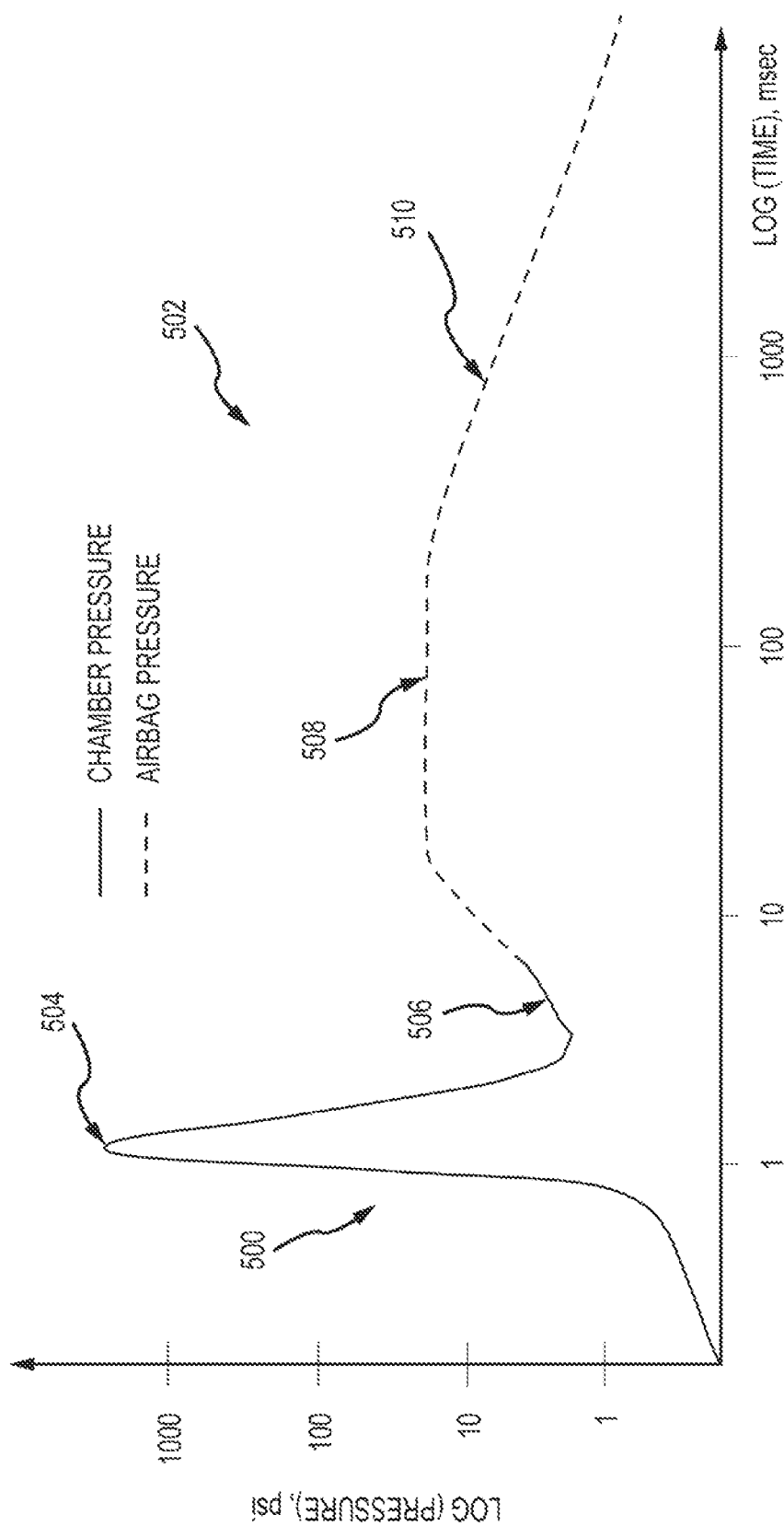
FIG. 5 is a plot of gas pressure versus time illustrating a desired airbag pressure profile and an embodiment of a controlled chamber pressure profile to produce the desired shape and total pressure impulse of the airbag pressure profile.

FIG. 5 shows a pressure profile 500 in the chamber that produces a desired airbag pressure profile 502 for the period after the airbag begins to unfold. In this example, the initial impulse 504 in the chamber of a few msec will lead to an inflation interval 506 of 10's of msec in the airbag to reach breakout pressure (full inflation), an inflated interval 508 of 10's of msec nominally at the breakout pressure and a deflation interval 510 of several 10's of msec after initial occupant impact. The initial high-pressure impulse 504 occurs prior to the airbag unfolding and results from the hot, high-pressure gas in the combustion chamber exhausting into the small volume of the folded airbag. As the airbag begins to unfold, the hot gas expands and cools and the pressure drops rapidly due to the increasing volume. During airbag inflation interval 506 the air bag pressure may rise by 1 psi/msec. The rate of inflation is adjustable by controlling the electrical input which controls how much hot gas is generated in the chamber. The breakout pressure 508 is nominally 30-40 psi, which is adjustable with the electrical input. The electrical input controls both the rise rate 506 and breakout pressure 508 through the amount of gas generated. Increase in electrical input will generate more gas and decrease in electrical input will generate less gas. Since the volume of the airbag is the same, more gas generated will result in faster rise rate 506 and higher breakout pressure 508 while less gas generated will result in slower rise rate 506 and lower breakout pressure 508. The deflation rate 510 can be controlled by extinguishing combustion of the propellant.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of deploying and inflating an airbag comprising:
   providing a combustion chamber;
   providing an amount of electrically operated propellant within the combustion chamber, said propellant comprising an ionic perchlorate-based oxidizer such that the propellant has a self-sustaining threshold pressure of at least 1,000 psi at which the propellant once ignited by an electrical input cannot be extinguished and below which the propellant can be extinguished by interruption of the electrical input;
   coupling the airbag to the combustion chamber;
   igniting the electrically operated propellant in the chamber by applying the electrical input to the electrically operated propellant; and
   controlling the electrical input to the electrically operated propellant to vary a rate of combustion of the ignited electrically operated propellant, hence varying the pressure in the chamber at levels less than the self-sustaining threshold pressure, to control a pressure profile in the airbag and a total pressure impulse delivered to the airbag.

2. The method of claim 1, wherein said ionic perchlorate-based oxidizer comprises a liquid perchlorate-based oxidizer of approximately 50 to 90 percent of a mass of the electrically operated propellant, further comprising:
   a binder of approximately 10 to 30 percent of the mass of the electrically operated propellant;
   a metal-based fuel of approximately 5 to 30 percent of the mass of the electrically operated propellant.

3. The method of claim 1, wherein the electrical input is interrupted to extinguish the electrically operated propellant when the chamber pressure is greater than 500 psi.

4. A method of deploying and inflating an airbag comprising:
   providing a combustion chamber with an electrode structure configured for coupling with an electrical power source;
   providing an amount of electrically operated propellant within the combustion chamber, said propellant comprising an ionic perchlorate-based oxidizer such that the propellant has a self-sustaining threshold pressure of at least 1,000 psi at which the propellant once ignited by an electrical input cannot be extinguished and below which the propellant can be extinguished by interruption of the electrical input;
   coupling the airbag to the combustion chamber;
   igniting the electrically operated propellant in the chamber by applying the electrical input to the electrically operated propellant via the electrode structure;
   generating pressurized gas within the chamber from combustion of the ignited electrically operated propellant, pressures in the chamber reaching more than 500 psi but never more than the self-sustaining threshold pressure of the propellant;
   exhausting the pressurized gas from the chamber to inflate the airbag;
   varying the electrical input to the electrically operated propellant to vary a rate of combustion of the ignited electrically operated propellant, hence varying the pressure in the chamber at levels less than the self-sustaining threshold pressure, to control a pressure profile in the airbag; and
   extinguishing the electrically operated propellant with the interruption of the electrical input to burn less than all of said propellant to control a total pressure impulse delivered to the airbag.

5. The method of claim 4, wherein there is only a single amount of the electrically operated propellant.

6. The method of claim 4, wherein the self-sustaining threshold pressure is at least 1,500 psi and wherein pressures within the chamber reach more than 1,000 psi.

7. The method of claim 4, wherein the pressure in the chamber reaches a peak pressure of more than 500 psi, and wherein the electrical input is varied to modulate the chamber pressure either before or after the peak pressure.

8. The method of claim 4, wherein the electrical input is interrupted to extinguish the electrically operated propellant at a chamber pressure greater than 500 psi.

9. The method of claim 4, wherein the electrical input is varied such that the pressure profile in the airbag estimates a desired pressure profile.

10. The method of claim 9, further comprising:
    computing the desired pressure profile based on at least one human factor input and at least one measured crash input.

11. The method of claim 10, further comprising:
    computing a propellant burn rate profile to provide the desired pressure profile in the airbag;
    computing an electrical input profile and chamber pressure profile to provide the propellant burn rate profile; and
    varying the electrical input according to the electrical input profile.

12. The method of claim 4, wherein said ionic perchlorate-based oxidizer comprises a liquid perchlorate-based oxidizer of approximately 50 to 90 percent of a mass of the electrically operated propellant, further comprising:
    a binder of approximately 10 to 30 percent of the mass of the electrically operated propellant;
    a metal-based fuel of approximately 5 to 30 percent of the mass of the electrically operated propellant.

13. The method of claim 12, wherein the metal-based fuel in cooperation with the liquid perchlorate-based oxidizer provides the electrically operated propellant with a specific energy of around 600 to 1100 joules per gram at ambient pressure.

14. The electrically operated propellant of claim 12, wherein the electrically operated propellant has an initial total pressure impulse value at an initial time, and a mature pressure impulse value at a second time after storage for at least 30 days at a temperature of around 140 degrees Fahrenheit, and the mature total pressure impulse value is substantially the same as the initial total pressure impulse value.

15. A method of deploying and inflating an airbag comprising:
    providing a combustion chamber;
    providing an amount of electrically operated propellant within the combustion chamber, said propellant comprising an ionic-based oxidizer such that the propellant has a self-sustaining threshold pressure of at least 1,000 psi at which the propellant once ignited by an electrical input cannot be extinguished and below which the propellant can be extinguished by interruption of the electrical input;
    coupling the airbag to the combustion chamber;
    igniting the electrically operated propellant in the chamber by applying the electrical input to the electrically operated propellant; and controlling the electrical input to the electrically operated propellant to vary a rate of combustion of the ignited electrically operated propellant, hence varying the pressure in the chamber at levels less than the self-sustaining threshold pressure, to control a pressure profile in the airbag and a total pressure impulse delivered to the airbag.

16. The method of claim 15, further comprising:
computing a specified pressure profile for the airbag based on at least one human factor input and at least one measured crash input;
computing a propellant burn rate profile to provide the specified pressure profile in the airbag;
computing an electrical input profile and chamber pressure profile to provide the propellant burn rate profile; and
varying the electrical input according to the electrical input profile.

17. The method of claim 15, further comprising interrupting the electrical input to extinguish the electrically operated propellant at a chamber pressure greater than 500 psi.

18. An airbag assembly, comprising:
a combustion chamber with an electrode structure configured for coupling with an electrical power source;
an amount of electrically operated propellant within the combustion chamber, said propellant comprising an ionic-based oxidizer such that the propellant has a self-sustaining threshold pressure of at least 1,000 psi at which the propellant once ignited by an electrical input cannot be extinguished and below which the propellant can be extinguished by interruption of the electrical input;
an airbag coupled to the combustion chamber; and
a controller configured to
apply the electrical input to the electrically operated propellant via the electrode structure to ignite the electrically operated propellant in the chamber, generate pressurized gas within the chamber from the combustion of the ignited electrically operated propellant to pressures in the chamber reaching more than 500 psi but never more than the self-sustaining threshold pressure of the propellant and exhaust pressurized gas from the chamber to inflate the airbag;
vary the electrical input to vary a rate of combustion of the ignited electrically operated propellant, hence varying the pressure in the chamber at levels less than the self-sustaining threshold pressure, to control a pressure profile in the airbag; and
interrupt the electrical input to extinguish the electrically operated propellant to burn less than all of said propellant to control a total pressure impulse delivered to the airbag.

19. The airbag assembly of claim 18, wherein there is only a single amount of the electrically operated propellant.

20. The airbag assembly of claim 18, wherein the controller is configured to
compute a specified pressure profile for the airbag based on at least one human factor input and at least one measured crash input;
compute a propellant burn rate profile to provide the specified pressure profile in the airbag;
compute an electrical input profile and chamber pressure profile to provide the propellant burn rate profile; and
vary the electrical input according to the electrical input profile.

21. The airbag assembly of claim 18, wherein the controller is configured to interrupt the electrical input to extinguish the electrically operated propellant at a chamber pressure greater than 500 psi to control the total pressure impulse.

22. The airbag assembly of claim 18, wherein the ionic-based oxidizer comprises an ionic perchlorate-based oxidizer.

23. The airbag assembly of claim 22, wherein said ionic perchlorate-based oxidizer comprises a liquid perchlorate-based oxidizer of approximately 50 to 90 percent of a mass of the electrically operated propellant, further comprising:
a binder of approximately 10 to 30 percent of the mass of the electrically operated propellant; and
a metal-based fuel of approximately 5 to 30 percent of the mass of the electrically operated propellant.

24. An airbag assembly, comprising:
a combustion chamber;
an amount of electrically operated propellant within the combustion chamber, said propellant comprising an ionic-based oxidizer such that the propellant has a self-sustaining threshold pressure of at least 1,000 psi at which the propellant once ignited by an electrical input cannot be extinguished and below which the propellant can be extinguished by interruption of the electrical input;
an airbag coupled to the combustion chamber; and
a controller configured to apply the electrical input to the electrically operated propellant to ignite the electrically operated propellant in the chamber and to vary a rate of combustion of the ignited electrically operated propellant, hence varying the pressure in the chamber at levels less than the self-sustaining threshold pressure, to control a pressure profile in the airbag and a total pressure impulse delivered to the airbag.

25. The airbag assembly of claim 24, wherein the ionic-based oxidizer comprises an ionic perchlorate-based oxidizer.

26. The airbag assembly of claim 25, wherein said ionic perchlorate-based oxidizer comprises a liquid perchlorate-based oxidizer of approximately 50 to 90 percent of a mass of the electrically operated propellant, further comprising:
a binder of approximately 10 to 30 percent of the mass of the electrically operated propellant; and
a metal-based fuel of approximately 5 to 30 percent of the mass of the electrically operated propellant.

27. The airbag assembly of claim 25, wherein the controller is configured to interrupt the electrical input to extinguish the electrically operated propellant at chamber pressures greater than 500 psi to control the total pressure impulse delivered to the airbag.

* * * * *